(12) United States Patent
Lindhorst

(10) Patent No.: US 8,407,668 B2
(45) Date of Patent: Mar. 26, 2013

(54) MODEL BASED SPREADSHEET SCRIPTING LANGUAGE

(75) Inventor: Gregory S. Lindhorst, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1035 days.

(21) Appl. No.: 11/925,068

(22) Filed: Oct. 26, 2007

(65) Prior Publication Data
US 2009/0113388 A1    Apr. 30, 2009

(51) Int. Cl.
G06F 9/44    (2006.01)
G06F 9/45    (2006.01)

(52) U.S. Cl. .......................................... 717/115; 717/139
(58) Field of Classification Search ........................ None
See application file for complete search history.

(56) References Cited

U.S. PATENT DOCUMENTS

| | | | |
|---|---|---|---|
| 6,341,292 B1 | 1/2002 | Cho et al. | |
| 6,430,603 B2 | 8/2002 | Hunter | |
| 6,470,349 B1 * | 10/2002 | Heninger et al. | 717/115 |
| 6,546,427 B1 | 4/2003 | Ehrlich et al. | |
| 6,701,485 B1 * | 3/2004 | Igra et al. | 715/210 |
| 6,742,162 B2 | 5/2004 | Bennett | 715/503 |
| 6,934,932 B2 * | 8/2005 | Dathathraya | 717/115 |
| 6,988,241 B1 | 1/2006 | Guttman et al. | 715/503 |
| 7,222,294 B2 | 5/2007 | Coffen et al. | 715/504 |
| 7,251,776 B2 * | 7/2007 | Handsaker et al. | 715/212 |
| 7,523,395 B1 * | 4/2009 | Namait et al. | 715/255 |
| 7,716,231 B2 | 5/2010 | Henshaw | |
| 7,836,425 B2 * | 11/2010 | Rubin et al. | 717/108 |
| 2001/0042048 A1 | 11/2001 | Boykin et al. | |
| 2002/0059233 A1 | 5/2002 | Bauchot et al. | 707/7 |
| 2002/0069083 A1 * | 6/2002 | Harter et al. | 705/1 |
| 2002/0111917 A1 | 8/2002 | Hoffman et al. | |
| 2002/0124182 A1 | 9/2002 | Bacso et al. | |
| 2002/0143831 A1 | 10/2002 | Bennett | 707/538 |
| 2002/0169760 A1 | 11/2002 | Cheung et al. | |
| 2003/0009649 A1 | 1/2003 | Martin et al. | 712/1 |
| 2003/0061278 A1 | 3/2003 | Agarwalla et al. | |
| 2003/0219708 A1 | 11/2003 | Janevski et al. | |
| 2004/0049579 A1 | 3/2004 | Ims et al. | |
| 2004/0081110 A1 | 4/2004 | Koskimies | |
| 2004/0133848 A1 | 7/2004 | Hunt et al. | |
| 2004/0168121 A1 | 8/2004 | Matz | |

(Continued)

FOREIGN PATENT DOCUMENTS

| | | |
|---|---|---|
| EP | 1076302 A1 | 2/2001 |
| JP | 7-240065 A | 9/1995 |

(Continued)

OTHER PUBLICATIONS

Haber et al., "A1: Spreadsheet-based Scripting for Developing Web Tools", IBM Research Center, LISA '05, pp. 197-208; <http://static.usenix.org/event/lisa05/tech/full_papers/haber/haber.pdf>.*

(Continued)

Primary Examiner — Thuy Dao
Assistant Examiner — Ben C Wang
(74) Attorney, Agent, or Firm — Woodcock Washburn LLP

(57) ABSTRACT

Techniques for programming using a model based spreadsheet scripting language are disclosed herein, where procedural aspects may be incorporated along with the model based aspects therein. In particular, techniques for performing calculations of a value, and recalculation of interdependent formulas using programs written with the model based spreadsheet scripting language are disclosed.

18 Claims, 7 Drawing Sheets

U.S. PATENT DOCUMENTS

| | | | |
|---|---|---|---|
| 2004/0216170 A1 | 10/2004 | Rashkovskiy et al. | |
| 2004/0225957 A1 | 11/2004 | Egilsson | 715/503 |
| 2005/0010910 A1* | 1/2005 | Lindhorst et al. | 717/108 |
| 2005/0044486 A1* | 2/2005 | Kotler et al. | 715/503 |
| 2005/0060718 A1* | 3/2005 | Lindhorst et al. | 719/315 |
| 2005/0066265 A1* | 3/2005 | Kotler et al. | 715/503 |
| 2005/0149910 A1* | 7/2005 | Prisament | 717/115 |
| 2006/0053383 A1* | 3/2006 | Gauthier et al. | 715/764 |
| 2006/0080595 A1 | 4/2006 | Chavoustie et al. | 715/503 |
| 2006/0080665 A1* | 4/2006 | Chavoustie et al. | 718/104 |
| 2006/0117246 A1* | 6/2006 | Bauchot et al. | 715/503 |
| 2006/0224946 A1* | 10/2006 | Barrett et al. | 715/503 |
| 2007/0061698 A1* | 3/2007 | Megiddo et al. | 715/503 |
| 2007/0073705 A1* | 3/2007 | Gray | 707/10 |
| 2007/0136666 A1* | 6/2007 | Khen et al. | 715/538 |
| 2008/0183766 A1* | 7/2008 | Weston et al. | 707/200 |
| 2008/0189303 A1* | 8/2008 | Bush et al. | 707/100 |
| 2009/0006466 A1* | 1/2009 | Ellis et al. | 707/103 R |
| 2009/0113388 A1 | 4/2009 | Lindhorst | |
| 2009/0228776 A1* | 9/2009 | Folting et al. | 715/219 |
| 2009/0328010 A1* | 12/2009 | Cao et al. | 717/139 |
| 2010/0275162 A1 | 10/2010 | Henshaw | |

FOREIGN PATENT DOCUMENTS

| | | |
|---|---|---|
| JP | 2002-328831 A | 11/2002 |
| JP | 2003-150932 A | 5/2003 |
| JP | 2003-289523 A | 10/2003 |
| JP | 2003-339000 A | 11/2003 |
| JP | 2004-5391 A | 1/2004 |
| JP | 2004-153696 A | 5/2004 |
| JP | 2004-159212 A | 6/2004 |
| WO | WO 03/019406 A2 | 3/2003 |
| WO | WO 2004/086395 A1 | 10/2004 |

OTHER PUBLICATIONS

Peter Warren, "Learning to Program: Spreadsheets, Scripting and HCI", 2004 ACM, ACE2004, pp. 327-333; <http://dl.acm.org/results.cfm?h=1&source_query=&&cfid=126856824&cftoken=92035447>.*

Cunha et al., "Model-Based Programming Environments for Spreadsheets", University of Minho, Semana de Engenharia 2010; pp. 1-12; <http://uminho.academia.edu/J%C3%A1comeCunha/Papers/906712/Model-based_programming_environments_for_spreadsheets>.*

Jácome Miguel Costa da Cunha, "Model-based Spreadsheet Engineering", Feb. 22, 2011, The Department of Informatics and the Computer Science and Technology Center, the University of Minho, Portugal, pp. 1-196; <http://alfa.di.uminho.pt/~jacome/down/thesis.pdf>.*

Zhao et al., "Research on Enterprise Spreadsheet Model Based-on Semantic", 2009 IEEE, FSKD '09, pp. 441-446; <http://ieeexplore.ieee.org/stamp/stamp.jsp?tp=&arnumber=5360049>.*

Cunha et al., "From Relational ClassSheets to UML+OCL", 2012 ACM, SAC'12, Riva del Garda, Italy; pp. 1151-1158; <http://dl.acm.org/results.cfm?h=1&cfid=135397448&cftoken=80384578>.*

Baker, J.E. et al., "Recursion and Spreadsheets", *eJSie*, 2005, 2(1), 50-72, www.sie.bond.edu.au.

Fisher II, M. et al., "The EUSES Spreadsheet Corpus: A Shared Resource for Supporting Experimentation with Spreadsheet Dependability Mechanisms", http://esquared.unl.edu, 1-7.

Sestoft, P., "A Spreadsheet Core Implementation in C#", Sep. 2006, Version 1.0, TR-2006-91, IT University Technical Report Series, ISSN 1600-6100, 135 pages.

"Output Alternatives: ImageReady & Pre-5.5—Exporting files for the web using ImageReady", Stanford University, School of Medicine, Copyright 2005, 2 pages.

"Adobe Photoshop 6.0 Online Manual", Adobe Systems, Inc., 2000, Accessed on Nov. 30, 2005, 9 pages.

EP Application No. 05109730.1 : Extended European Search Report, Dec. 27, 2005, 5 pages.

* cited by examiner

Loan Calculator with Extra Payments

Loan Amount: 100000
Annual Interest Rate: 5 %
Loan Period in Years: 30
Start Date of Loan: Mon Jan 1 00:00:00 PST 2007
Optional Extra Payments: 100

Scheduled Monthly Payment: 536.82
Scheduled Number of Payments: 360.00
Actual Number of Payments: 256.00
Total of Early Payments: 25600.00
Total Interest: 62675.53

| No. | Payment Date | Beginning Balance | Scheduled Payment | Extra Payment | Total Payment | Principal | Interest | Ending Balance |
|---|---|---|---|---|---|---|---|---|
| 1.00 | Mon Jan 1 00:00:00 PST 2007 | 100000.00 | 536.82 | 100.00 | 636.82 | 220.15 | 416.67 | 99779.85 |
| 2.00 | Thu Feb 1 00:00:00 PST 2007 | 99779.85 | 536.82 | 100.00 | 636.82 | 221.07 | 415.75 | 99558.77 |
| 3.00 | Thu Mar 1 00:00:00 PST 2007 | 99558.77 | 536.82 | 100.00 | 636.82 | 221.99 | 414.83 | 99336.78 |
| 4.00 | Sun Apr 1 00:00:00 PDT 2007 | 99336.78 | 536.82 | 100.00 | 636.82 | 222.92 | 413.90 | 99113.86 |
| 5.00 | Tue May 1 00:00:00 PDT 2007 | 99113.86 | 536.82 | 100.00 | 636.82 | 223.85 | 412.97 | 98890.01 |
| 6.00 | Fri Jun 1 00:00:00 PDT 2007 | 98890.01 | 536.82 | 100.00 | 636.82 | 224.78 | 412.04 | 98665.23 |
| 7.00 | Sun Jul 1 00:00:00 PDT 2007 | 98665.23 | 536.82 | 100.00 | 636.82 | 225.72 | 411.11 | 98439.52 |
| 8.00 | Wed Aug 1 00:00:00 PDT 2007 | 98439.52 | 536.82 | 100.00 | 636.82 | 226.66 | 410.16 | 98212.86 |
| 9.00 | Sat Sep 1 00:00:00 PDT 2007 | 98212.86 | 536.82 | 100.00 | 636.82 | 227.60 | 409.22 | 97985.26 |
| 10.00 | Mon Oct 1 00:00:00 PDT 2007 | 97985.26 | 536.82 | 100.00 | 636.82 | 228.55 | 408.27 | 97756.71 |
| 11.00 | Thu Nov 1 00:00:00 PDT 2007 | 97756.71 | 536.82 | 100.00 | 636.82 | 229.50 | 407.32 | 97527.21 |
| 12.00 | Sat Dec 1 00:00:00 PST 2007 | 97527.21 | 536.82 | 100.00 | 636.82 | 230.46 | 406.36 | 97296.75 |
| 13.00 | Tue Jan 1 00:00:00 PST 2008 | 97296.75 | 536.82 | 100.00 | 636.82 | 231.42 | 405.40 | 97065.33 |

FIG. 4

Loan Calculator with Extra Payments

Loan Amount: 100000
Annual Interest Rate: 5 %
Loan Period in Years: 30
Start Date of Loan: Mon Jan 1 00:00:00 PST 2007
Optional Extra Payments: 100

Scheduled Monthly Payment: 536.82
Scheduled Number of Payments: 360.00
Actual Number of Payments: 256.00
Total of Early Payments: 25600.00
Total Interest: 62675.53

[Reset Values]

| No. | Payment Date | Beginning Balance | Scheduled Payment | Extra Payment | Total Payment | Principal | Interest | Ending Balance |
|---|---|---|---|---|---|---|---|---|
| 1.00 | Mon Jan 1 00:00:00 PST 2007 | 100000.00 | 536.82 | 100.00 | 636.82 | 220.15 | 416.67 | 99779.85 |
| 2.00 | Thu Feb 1 00:00:00 PST 2007 | 99779.85 | 536.82 | 100.00 | 636.82 | 221.07 | 415.75 | 99558.77 |
| 3.00 | Thu Mar 1 00:00:00 PST 2007 | 99558.77 | 536.82 | 100.00 | 636.82 | 221.99 | 414.83 | 99336.78 |
| 4.00 | Sun Apr 1 00:00:00 PDT 2007 | 99336.78 | 536.82 | 100.00 | 636.82 | 222.92 | 413.90 | 99113.86 |
| 5.00 | Tue May 1 00:00:00 PDT 2007 | 99113.86 | 536.82 | 100.00 | 636.82 | 223.85 | 412.97 | 98890.01 |
| 6.00 | Fri Jun 1 00:00:00 PDT 2007 | 98890.01 | 536.82 | 100.00 | 636.82 | 224.78 | 412.04 | 98665.23 |
| 7.00 | Sun Jul 1 00:00:00 PDT 2007 | 98665.23 | 536.82 | 100.00 | 636.82 | 225.72 | 411.11 | 98439.52 |
| 8.00 | Wed Aug 1 00:00:00 PDT 2007 | 98439.52 | 536.82 | 100.00 | 636.82 | 226.66 | 410.16 | 98212.86 |
| 9.00 | Sat Sep 1 00:00:00 PDT 2007 | 98212.86 | 536.82 | 100.00 | 636.82 | 227.60 | 409.22 | 97985.26 |
| 10.00 | Mon Oct 1 00:00:00 PDT 2007 | 97985.26 | 536.82 | 100.00 | 636.82 | 228.55 | 408.27 | 97756.71 |
| 11.00 | Thu Nov 1 00:00:00 PDT 2007 | 97756.71 | 536.82 | 100.00 | 636.82 | 229.50 | 407.32 | 97527.21 |
| 12.00 | Sat Dec 1 00:00:00 PST 2007 | 97527.21 | 536.82 | 100.00 | 636.82 | 230.46 | 406.36 | 97296.75 |
| 13.00 | Tue Jan 1 00:00:00 PST 2008 | 97296.75 | 536.82 | 100.00 | 636.82 | 231.42 | 405.40 | 97065.33 |

FIG. 5

MODEL BASED SPREADSHEET SCRIPTING LANGUAGE

BACKGROUND

Model based programming and procedural programming are two different programming language models. To illustrate the differences between model based and procedural programming, consider the following statements:

10 X=2

20 Y=X+5

30 X=1

40 PRINT Y

In a procedural programming language, printing Y on line 40 would result in a 7, since the value of Y was set at line 20. In a model based programming language, line 20 tells the system that Y is dependent on X, and should float with the value of X. Thus, after line 30, the value of Y will be 6, and 6 would be output at line 40.

Many conventional spreadsheet applications allow users to develop interdependent formulas in which variables (e.g., X and Y) are references to cells in a spreadsheet table. The formulas may be used to execute calculations according to the model based approach. This is very powerful, and one reason why spreadsheets are such indispensable tools. An entire model of interdependent formulas can be built up, and then changing one value can cause a ripple effect across all the expressions, without the programmer needing to explicitly re-execute all those expressions.

In the exemplary statements above, lines 10, 20, 30, 40 are executed in order, thereby injecting the procedural approach into the statements. Many conventional spreadsheet applications have no sense of an ordered procedural approach. To inject a procedural aspect into spreadsheet operations and/or to perform advanced tasks within a spreadsheet application, it is typically required to use a separate procedural programming language such as, for example, Visual Basic, in connection with the spreadsheet application. However, there are a number of drawbacks associated with this model. In particular, these programming languages are often too complex and/or unfamiliar to many spreadsheet users. Additionally, functions typically don't translate well between spreadsheets and procedural programming languages, and there is a basic mismatch between the procedural approach and spreadsheet's model driven approach. Another drawback of this model is that conventional procedural programming languages may consume too many resources in a server environment. Conventional procedural programming languages typically also have security issues that make them undesirable for execution in a server environment. Thus, many conventional spreadsheet services do not even offer a procedural programming language to users.

SUMMARY

Techniques for programming using a model based spreadsheet scripting language are disclosed herein, where procedural aspects may be incorporated along with model based aspects therein. This permits the user to perform advanced tasks in the spreadsheet application while enabling some order or control over the execution of the program.

Techniques for performing calculations of a value using programs written with the model based spreadsheet scripting language are disclosed, such as when a value for a second variable in a spreadsheet table is defined as being based upon a value for a first variable. The first and/or second variable may be a cell reference or a cell range reference corresponding to a cell or a range of cells within the spreadsheet table. The variables need not necessarily, however, be cell related. Execution of the program may be dependent upon the detection of a triggering event, which may be, for example, receipt of a value for the first variable or the selection of a reset value function.

Techniques for performing recalculation of interdependent formulas using programs written with the model based spreadsheet scripting language are further disclosed. These programs may also rely upon the detection of a triggering event to execute the program, such as the receipt of a new or changed value for a variable that is associated with one or more of the interdependent formulas.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The illustrative embodiments will be better understood after reading the following detailed description with reference to the appended drawings, in which:

FIG. 4 is a screen shot of an exemplary web page utilizing a model base scripting language;

FIG. 5 is a screen shot of the exemplary web page depicted in FIG. 4 utilizing a mixed model based and procedural based scripting language;

DETAILED DESCRIPTION

Figure 1:
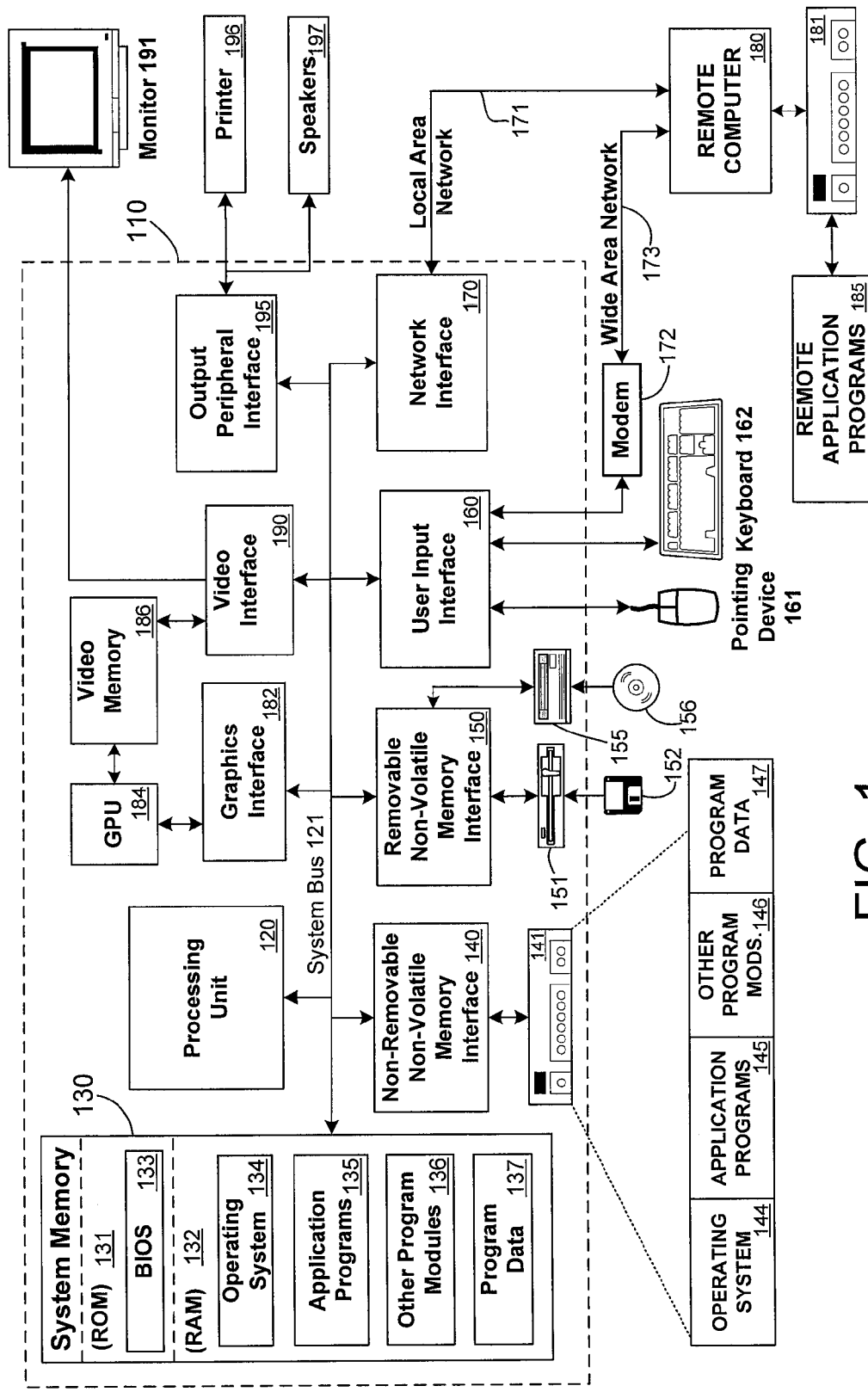
FIG. 1 is a block diagram an exemplary computing device.

The inventive subject matter is described with specificity to meet statutory requirements. However, the description itself is not intended to limit the scope of this patent. Rather, it is contemplated that the claimed subject matter might also be embodied in other ways, to include different steps or combinations of steps similar to the ones described in this document, in conjunction with other present or future technologies FIG. 1 illustrates an example of a suitable computing system environment 100 in which the subject matter described above may be implemented. The computing system environment 100 is only one example of a suitable computing environment and is not intended to suggest any limitation as to the scope of use or functionality of the subject matter described above. Neither should the computing environment 100 be interpreted as having any dependency or requirement relating to any one or combination of components illustrated in the exemplary operating environment 100.

With reference to FIG. 1, computing system environment 100 includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181.

It will be appreciated that the network connections shown are exemplary and other means of establishing a communications link between the computers may be used.

Figure 2:
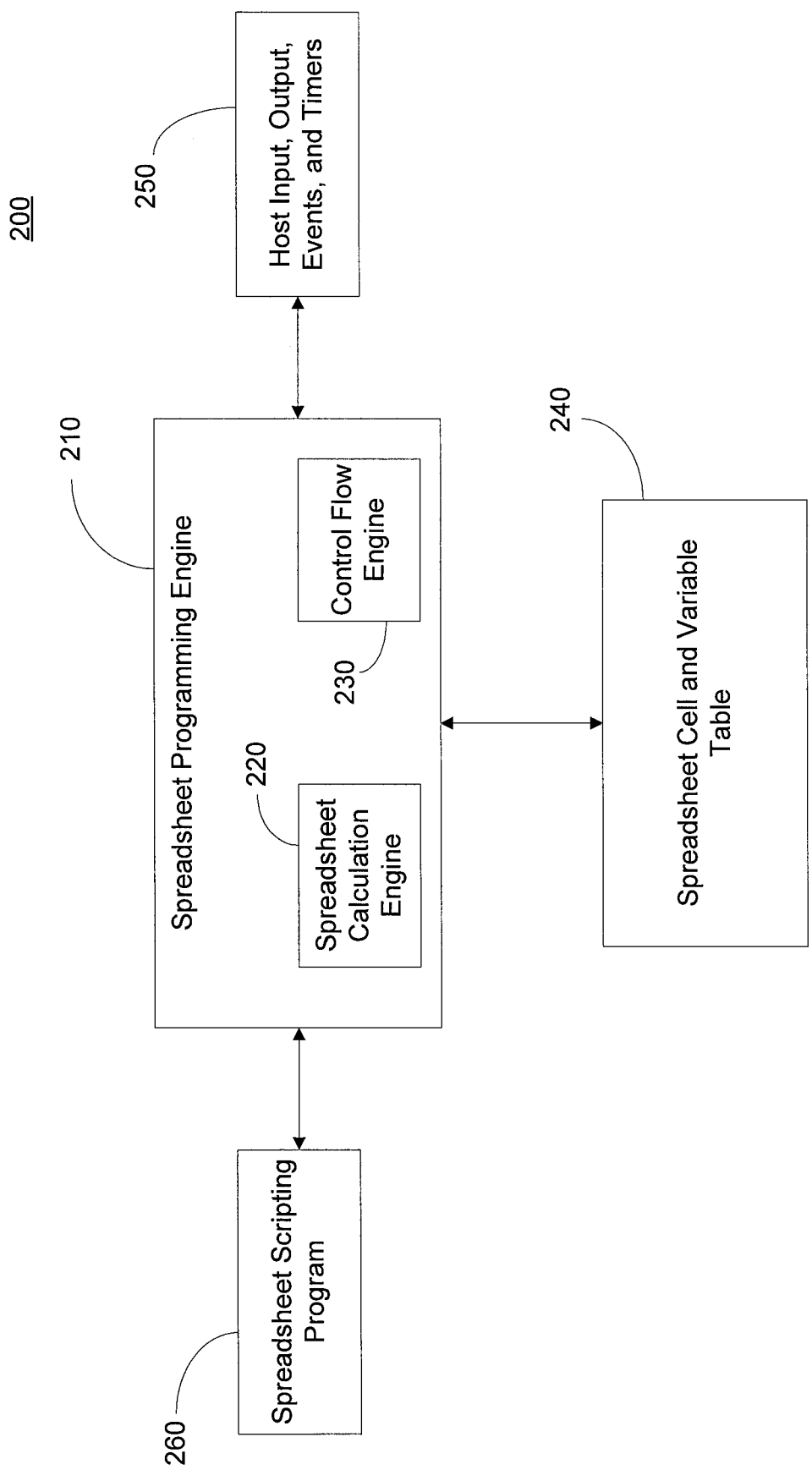
FIG. 2 is a block diagram of a spreadsheet application implementing the scripting language of the present invention.

Computer 110 typically will include a spreadsheet program among applications programs 135 and 145. While formulas may be easily implemented into a spreadsheet table, advanced tasks are accomplished by means of programming. As seen in FIG. 2, a scripting host 200 includes a spreadsheet programming engine 210 which includes a spreadsheet calculation engine component 220 and a control flow engine component 230. Scripting host 200 may be, for example, a spreadsheet application, a web browser, or any other scripting environment. Naturally, spreadsheet programming engine 210 interacts with other aspects of scripting host 200, such as a spreadsheet cell and variable table 240 and an interface 250 involving a host input, output, events and timers. In order for scripting host 200 to enable programming therein, a spreadsheet scripting program 260 also interacts with spreadsheet programming engine 210. In this way, users of scripting host 200 may be able to build web pages, extend collaborative efforts, and automate calculations for spreadsheet tables and other related applications.

As indicated herein, spreadsheet applications are typically model based and separate programming languages are required to perform many advanced tasks. Such programming languages utilize a procedural approach which don't translate well with the model driven approach of the spreadsheet application. In order to overcome this mismatch, spreadsheet scripting program 260 may incorporate a combination of both approaches to reflect a mixed concept enabling both model based and procedural based programming.

One exemplary use for a spreadsheet program may involve an expression which needs to be replicated within a spreadsheet table. For example, this may involve the following in a typical model based system:

$B1=2$ $A1=1$ $A2=A1+2+B\$1$ $A3=A2+2+B\$1$ $A4=A3+2+B\$1$ $A5=A4+2+B\$1$ where A1, A2, A3, A4, A5 and B1 involve values for certain cells in a spreadsheet table. It will be appreciated that this is not a very concise representation and could lead to errors if A4's expression is changed accidentally.

By utilizing spreadsheet scripting program 260, however, this could be rewritten as:

$A1=1$ $A2:A5=A1+2+B\$1$ where A1 is treated as a relative reference and B$1 is treated as an absolute reference. Thus, the user only needs to update one expression to cause all the expressions in A2:A5 to be changed.

Another aspect of mixing model and procedural based programming from spreadsheet scripting program 260 involves providing tags that are interpreted by spreadsheet programming engine 210 to implement logic in a web page. It will be understood that in such case spreadsheet scripting program 260 may be incorporated within scripting host 200 or function via a separate host. In addition, it is preferred that spreadsheet scripting program 260 be able to interact with another scripting program (e.g., JavaScript).

Figure 3:
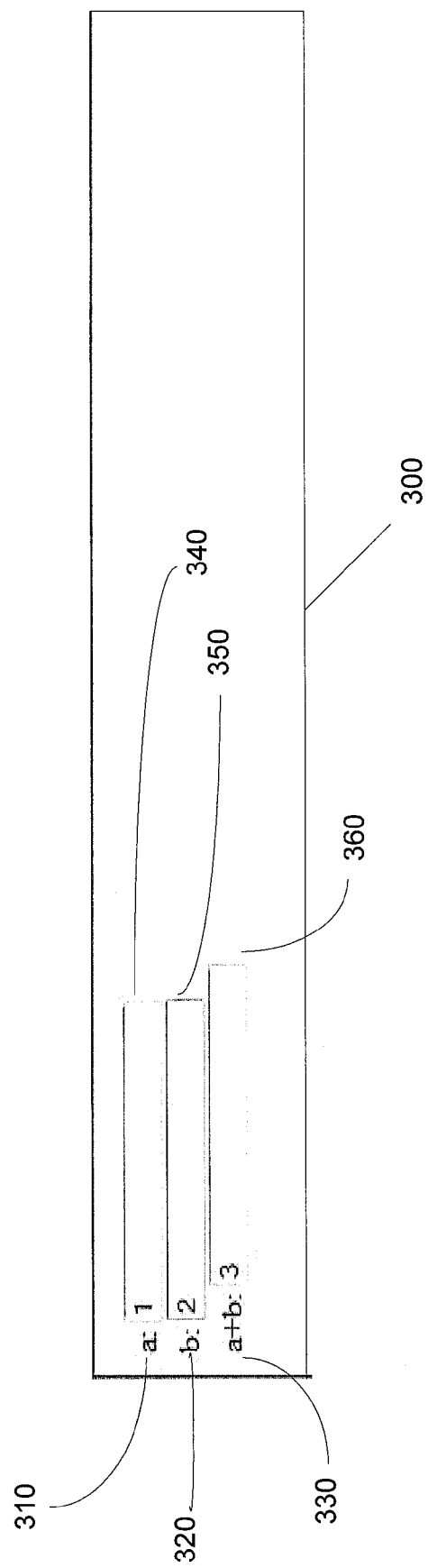
FIG. 3 is a partial screen shot of a web page including an exemplary use of the scripting language of the present invention.

It will be appreciated that the following program may be composed so that a web page 300 (as seen in FIG. 3) displays cells 310, 320 and 330 from a spreadsheet table which are able to interact within corresponding text boxes 340, 350, and 360, respectively.

```
<html>
    <script language="ExcelScript">
        c = a + b
    </script>
    <body>
        a: <input type=text id=a><br>
        b: <input type=text id=b><br>
        a + b: <input type=text id=c>
    <body>
    <script src="ExcelScript.js"></script>
<html>
```

A user of web page 300 will be able to interact with text boxes 340, 350 and 360 as expected. Since recalculation of web page 300 is automatic, no button click or other onchange event is needed to perform recalculation of cell 330.

Another example of how spreadsheet scripting program 260 may differ from the typical model based programming approach is depicted in FIGS. 4 and 5. As seen in FIG. 4, a screen 400 depicting a loan amortization template including a spreadsheet 410 having a first section with a plurality of cells 420, 430, 440, 450, and 460 (associated with a Loan amount, Annual interest rate, Loan period in years, Start date of loan, and Optional payments, respectively) for which values can be input. A second section having a plurality of cells 465, 470, 475, 480 and 485 are also provided which are associated with certain calculated values (i.e., Scheduled monthly payment, Scheduled number of payments, Actual number of payments, total of early payments, and Total interest, respectively). Further, a spreadsheet table 490 is further provided therein which sets forth a listing of items for the first year of the loan. It will be understood that this template reflects a model based approach to programming, where the values in cells 465, 470, 475, 480, and 485, as well as those within the cells of spreadsheet table 490, are automatically calculated based upon the information provided within text boxes 410, 420, 430, 440 and 450.

While web page 500 depicts a similar loan amortization template, it provides a plurality of text boxes 510, 520, 530, 540 and 550 into which values for Loan Amount, Annual Interest Rate, Loan Period in Years, Start Date of Loan, and Optional Extra Payments may be input. From this information, values for Scheduled Monthly Payment, Scheduled Number of Payments, Actual Number of Payments, Total of Early Payments, and Total Interest may be calculated and displayed in a section 560. A table 570 is further provided in web page 500 similar to table 490 in FIG. 4. Contrary to cells 465, 470, 475, 480 and 485 and spreadsheet table 490 in FIG. 4, however, the values in section 560 and a table 570 are not model based and therefore not automatically recalculated upon a change within any of text boxes 510, 520, 530, 540 and 550. Instead, a Reset Values button 580 is provided so that recalculations based on new information in the text boxes takes place when button 580 is clicked. Exemplary logic for producing these items within web page 500 includes:

```
<script language="ExcelScript">
Values_Entered = IF
(Loan_Amount*Interest_Rate*Loan_Years*Loan_Start>0,1,0)
Interest_Rate = Interest_Rate_Input / 100
Name Pay_Num = a18:a377
Name Pay_Date = b18:b377
Name Beg_Bal = c18:c377
Name Sched_Pay = d18:d377
Name Extra-Pay = e18:e377
Name Total_Pay = f18:f377
Name Princ = g18:g377
Name Int = h18:h377
Name End_Bal = i18:i377
a18 = IF (Values_Entered, 1, "")
a19:a377 = IF (Values_Entered, a18+1, "")
b18 = IF (Pay_Num<> "", Loan_Start, "")
b19:b377 = IF (Pay_Num<> "",date (year
(b18),month (b18) + 1,day (b18)), "")
c18 = IF (Values_Entered, Loan_Amount, "")
c19:c377 = IF (Pay_Num<> "", i18, "")
d18:d377 = IF (Pay_Num<> "", Scheduled_Monthly_Payment, "")
e18:e377 = IF (Pay_Num<> "", Scheduled_Extra_Payments, "")
f18:f377 = IF (Pay_Num<> "", Sched_Pay+Extra_Pay, "")
g18:g377 = IF (Pay_Num<> "", Total_Pay-Int, "")
h18:h377 = IF (Pay_Num<> "", Beg_Bal*Interest_Rate/12, "")
i18:i377 = IF (Pay_Num<> "", Beg_Bal-Princ, "")
Number_Of_Payments = MATCH (0.01,End_Bal,-1) +1
<script>
```

It will be noted that the formulas are the same for web pages 400 and 500 and the spreadsheet grid (A18 through I377) has the same formula assignment. Relative references can be applied to a specified range (e.g., c19:377=IF (Pay_Num<>"",i18,"")). Further, the addition of a "Name" statement in the logic allows named ranges.

Cells in a spreadsheet table are essentially variables that may contain either a dynamic formula or a static value. In such case, one may be able to write the logic as follows for a particular cell:

```
For a1 := 1 to 100
    Cell (a1, 2) := a1 * 100
Next
```

It will be understood that the operator ":=" in the spreadsheet scripting language means to "evaluate the formula and place in the cell." This is distinguished from the "=" operator, which means "assign the formula to the cell, allowing the value to float with the formula's dependencies." Of course, there is no reason that the "=" operator can't be used inside the "For" loop to reassign the formula associated with the cell.

Another advantage of spreadsheet scripting language 260 is the ability to write procedures and event handlers through control flow. For example, it will seen that the aforementioned Reset Values button 580 is provided to control when recalculations based on new information in the text boxes takes place. This control of when operations take place is different from the model based approach and exemplary logic therefor may be as follows:

```
<script language = "ExcelScript">
    Function Reset
        Loan_Amount : = ""
        Interest_Rate_Input : = ""
        Loan_Years : = ""
        Loan_Start : = ""
        Scheduled_Extra_Payments : = ""
    End Function
</script>
```

Figure 6:
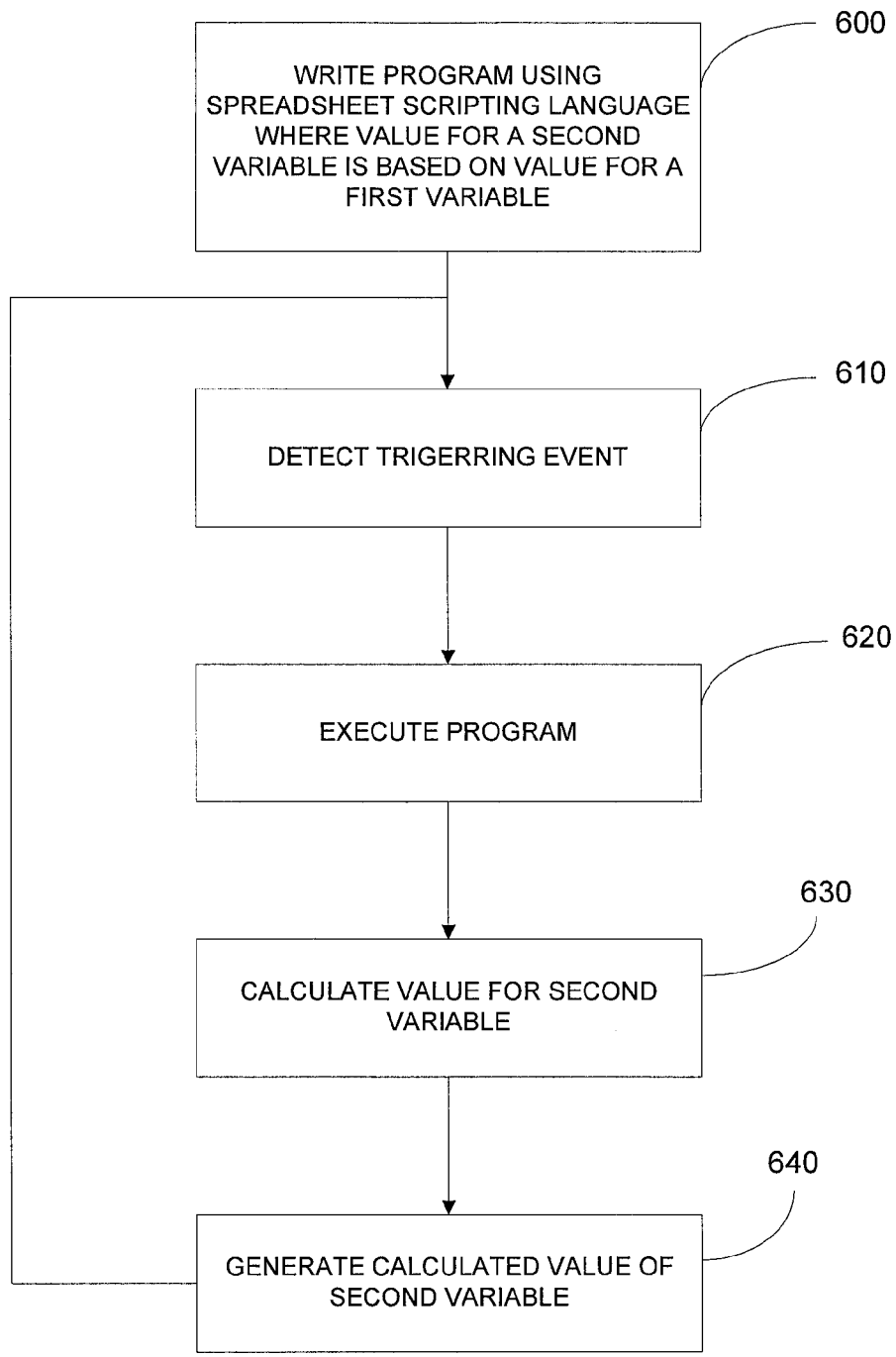
FIG. 6 is a flow diagram depicting a process for calculating a value in a spreadsheet application using a mixed model based and procedural based scripting language; and, FIG. 7 is a flow diagram depicting a process for recalculating values in a spreadsheet application using a mixed model based and procedural based scripting language.

In order to better understand the process undertaken in a spreadsheet application which includes a program containing both model based and procedural based aspects therein, it will be seen that FIG. 6 depicts certain exemplary steps for performing a calculation in the application. As seen therein, a program is written using spreadsheet scripting language 260 where the value for a second variable is based on the value for a first variable (box 600). It will be appreciated that the first and/or second variable may be a cell reference corresponding to a cell in a spreadsheet table or even a cell range reference corresponding to a range of cells in a spreadsheet table. Upon the detection of a triggering event (box 610), the program is executed (box 620). It will be understood that the triggering event may be model based, such as the receipt of a value for the first variable. Alternatively, the triggering event may be procedurally based, such as the selection of a reset value function like that described herein with respect to FIG. 5. Insofar as execution of the program is concerned, this may be accomplished as part of the spreadsheet application itself or by a web browser application. Thereafter, the value for the second variable is calculated (box 630) and an output reflecting such calculated value for the second variable is generated (box 640). A feedback loop from box 640 to 610 shows that the value for the second variable can be automatically recalculated in response to detection of a repetition or occurrence of another triggering event.

It will further be understood that the program is preferably a textual representation of at least a portion of a spreadsheet and the formulas contained therein. The spreadsheet scripting language itself may be hosted within the spreadsheet application or within a browser.

Figure 7:
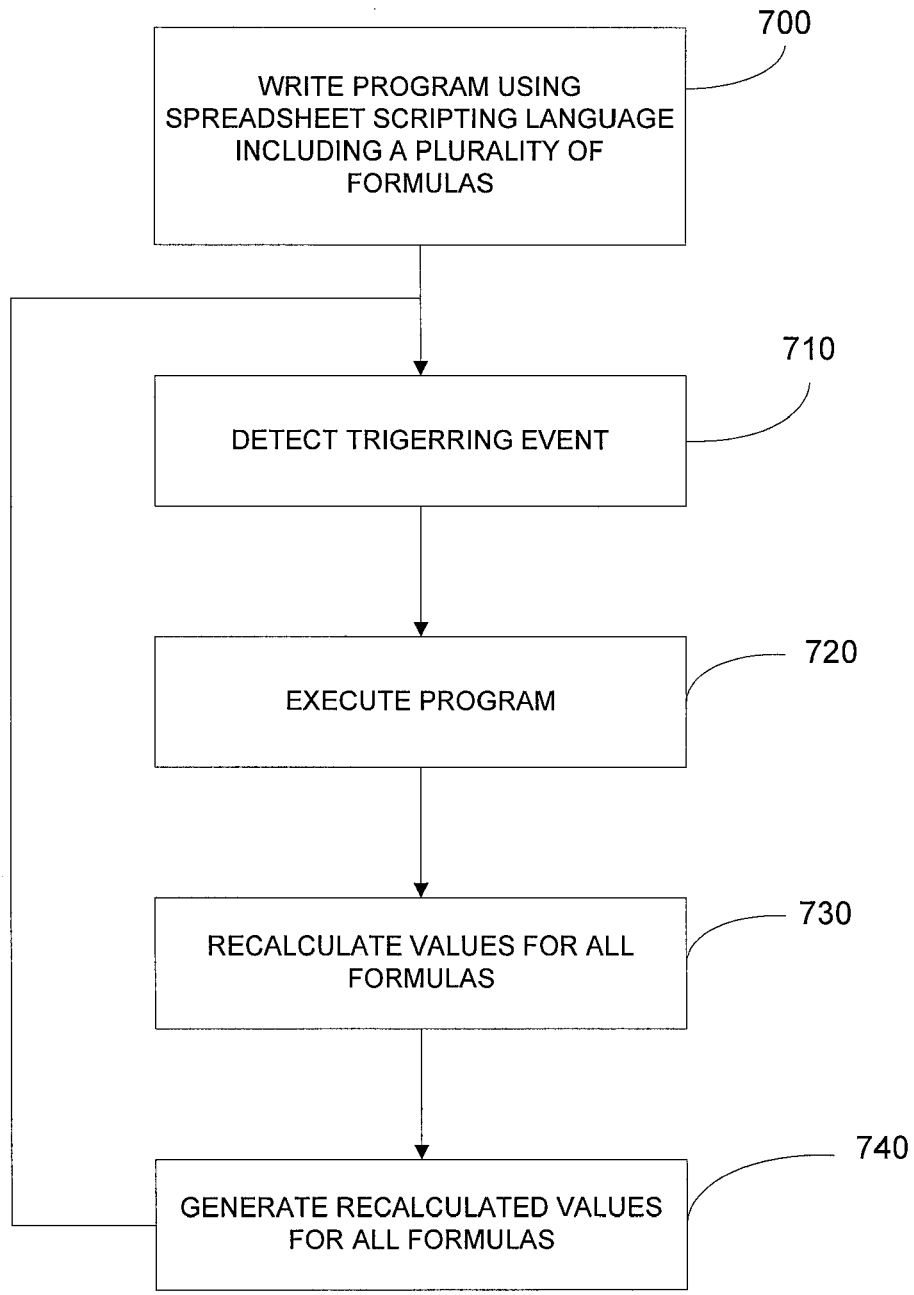

In another exemplary process, FIG. 7 depicts the steps undertaken to recalculate a plurality of interdependent formulas associated with a spreadsheet table when the value of a variable is changed. As seen therein, a program is written using spreadsheet scripting language 260 for a plurality of interdependent formulas in a spreadsheet table (box 700). It will be appreciated that the formulas generally will correspond to a cell in a spreadsheet table. Upon the detection of a triggering event (box 710), the program is executed (box 720). It will be understood that the triggering event preferably will involve the receipt of a new or changed value for a variable in at least one of the formulas. Once again, execution of the program may be accomplished as part of the spreadsheet application itself or by a web browser application. Thereafter, values for all the formulas are recalculated (box 730) and an output reflecting such recalculated values are generated (box 740). A feedback loop from box 740 to 710 shows that values for all formulas can be automatically recalculated in response to detection of a repetition or occurrence of another triggering event. It will be understood that recalculation of the values for the formulas may be accomplished automatically or upon selection of a reset value function. Further, it is also optional to recalculate the values for the formulas in a specified order.

Although the subject matter has been described in language specific to the structural features and/or methodological acts, it is to be understood that the subject matter defined in the appended claims is not necessarily limited to the specific features or acts described above. Rather, the specific features or acts described above are disclosed as example forms of implementing the claims.

What is claimed:

1. A computer readable storage memory having stored thereon computer executable instructions for calculating a value using a model based spreadsheet scripting language, the computer executable instructions comprising:
   executing a program that defines a value for a second variable based on a value for a first variable, the program written in the model based spreadsheet scripting language whereby the value for the second variable changes repeatedly when the value for the first variable changes repeatedly, the program comprising a textual representation of at least a portion of a spreadsheet and a plurality of formulas contained in the spreadsheet, the spreadsheet comprising a first cell having a first value that is model-based and that is recalculated when the value of the first variable changes, the model based spreadsheet language incorporating procedural elements for calculation of spreadsheet values and thereby enabling a second cell having a second value that is not model-based and that is recalculated in response to selection of a reset function;
   receiving the value for the first variable;
   calculating the value for the second variable based on the value for the first variable in the program; and,
   generating an output comprising the calculated value for the second variable.

2. The computer readable storage memory of claim 1, wherein the computer-executable instructions further comprise automatically recalculating the value for the second variable without receiving an explicit instruction to do so.

3. The computer readable storage memory of claim 1, wherein the first variable and/or the second variable is a cell reference corresponding to a cell in a spreadsheet table.

4. The computer readable storage memory of claim 1, wherein the first variable and/or the second variable is a cell range reference corresponding to a range of cells in a spreadsheet table.

5. The computer readable storage memory of claim 1, wherein the computer-executable instructions further comprise:
   detecting a triggering event that triggers the calculating of the value for the second variable; and,
   calculating the value for the second variable responsive to the triggering event.

6. The computer readable storage memory of claim 5, wherein the triggering event is receiving the value for the first variable.

7. The computer readable storage memory of claim 5, wherein the triggering event is the selection of the reset function.

8. The computer readable storage memory of claim 1, wherein the program is executed by a spreadsheet application.

9. The computer readable storage memory of claim 1, wherein the scripting language is hosted within a browser.

10. The computer readable storage memory of claim 1, wherein the program is a textual representation of the spreadsheet and all formulas contained therein.

11. A method of recalculating values for a plurality of formulas using a model based spreadsheet scripting language, comprising the following steps:
    executing a program that defines the plurality of formulas, the program written in the model based spreadsheet scripting language whereby the values for the plurality of formulas change repeatedly when a first variable in one of the plurality of formulas changes repeatedly, the program comprising a textual representation of at least a portion of a spreadsheet and the plurality of formulas contained in the spreadsheet, the spreadsheet comprising a first cell having a first value that is model-based and that is recalculated when the first variable changes, the model based spreadsheet language incorporating procedural elements for calculation of spreadsheet values and thereby enabling a second cell having a second value that is not model-based and that is recalculated in response to selection of a reset function;
    receiving a change in value for the first variable;
    recalculating the values for the plurality of formulas based on the change in value for the first variable; and,
    generating an output comprising the recalculated values for the plurality of formulas.

12. The method of claim 11, further comprising automatically recalculating the values for the plurality of formulas without receiving an explicit instruction to do so.

13. The method of claim 11, wherein variables in the plurality of formulas correspond to specified cells within a spreadsheet.

14. The method of claim 11, wherein the plurality of formulas are interdependent on each other.

15. The method of claim 11, wherein the values for all of the plurality of formulas are recalculated upon selection of the reset function.

16. A method of representing a spreadsheet, comprising the following steps:
    executing a program that defines a plurality of formulas, the program written in a model based spreadsheet scripting language whereby values of the plurality of formulas change repeatedly when a first variable in one of the plurality of formulas changes repeatedly, the program comprising a textual representation of at least a portion of the spreadsheet and the plurality of formulas contained in the spreadsheet, the spreadsheet comprising a first cell having a first value that is model-based and that is recalculated when the first variable changes, the model based spreadsheet language incorporating procedural elements for calculation of spreadsheet values and thereby enabling a second cell having a second value that is not model-based and that is recalculated in response to selection of a reset function; and
    implementing the procedural elements into the program to define order therein.

17. The method of claim 16, further comprising the step of implementing control flow to the program.

18. The method of claim 16, wherein additional programming languages are able to interface with the model based spreadsheet scripting language in the program.

* * * * *